Patented Aug. 20, 1929.

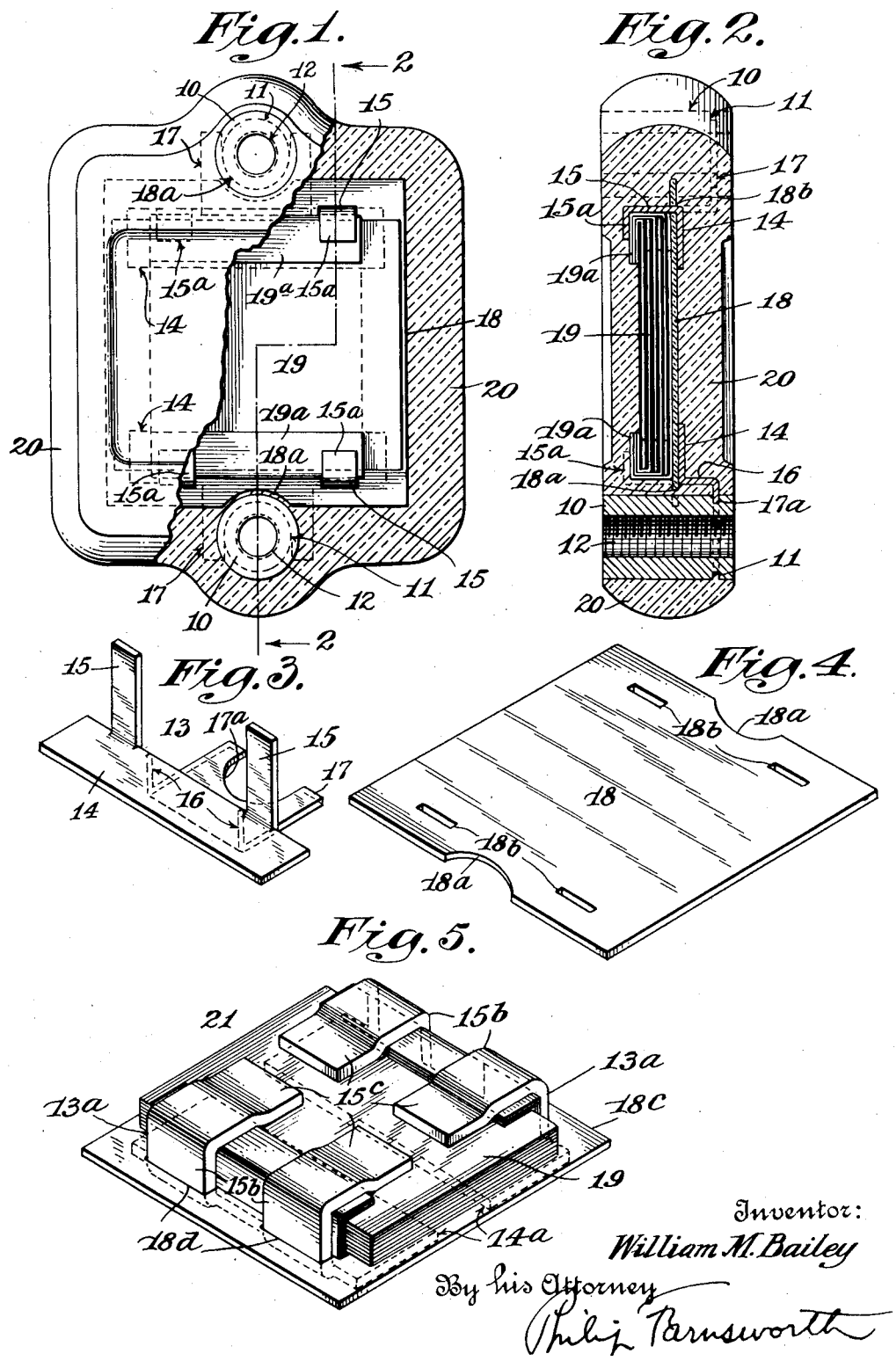

1,725,123

UNITED STATES PATENT OFFICE.

WILLIAM M. BAILEY, OF LYNN, MASSACHUSETTS, ASSIGNOR TO WIRELESS SPECIALTY APPARATUS COMPANY, OF BOSTON, MASSACHUSETTS, A CORPORATION OF NEW YORK.

ELECTRICAL CONDENSER.

Application filed May 15, 1928. Serial No. 277,814.

This invention relates to capacitors, and more particularly to the small fixed type for use in radio and other electrical purposes.

Hitherto small, fixed type capacitors have been constructed by assembling a stack of alternate dielectrics and armatures or foils, the foils being staggered with respect to each other, those of diverse polarity protruding from opposite sides of the stack and held in electrical and mechanical cooperation by means of end clamps or gripping members. These end clamps merely exerted a friction grip and units made therewith were susceptible of disadvantages due to the slipping off of the clamps, resulting in a decrease in capacity or destruction of the capacitor. To remedy this danger due to the slipping of the end clamps, it has been proposed to provide a top dielectric plate of fiber, or the like, of suitable thickness, slotted, as desired, to cover the stack, the end clamps being deformed into gripping contact with the slots so provided. Such structures have the inherent disadvantage of a lack of proper support for the central portion of the stack, and, if roughly handled during shipment, the clamps are loosened, with a resultant decrease in capacity.

It is an object of the present invention to provide a fixed capacitor which is so formed and constituted as to be readily manufactured and whose capacity is definitely assured.

It is a further object of the present invention to provide a capacity which can be shipped without damage even under adverse conditions.

Yet another object of this invention is the provision of such a condenser particularly suited for use in the preparation of molded fixed condensers of a small rated capacity.

A further object of this invention is the provision of an improved support and clamping means for a condenser stack of alternate mica dielectrics and armatures.

These and other desirable objects of this invention will be described in the following specification and illustrated in the accompanying drawings, which are given merely by way of example as preferred embodiments, it being understood that the underlying principles may be incorporated in a variety of devices without departing from the spirit and scope of my invention.

In the drawings

Fig. 1 is a plan view, partly in section of the improved condenser molded in a suitable casing;

Fig. 2 is a longitudinal section on the line 2—2 in Fig. 1 looking in the direction of the arrows;

Fig. 3 is a perspective view of one of the improved connecting clamps;

Fig. 4 is a perspective view of a micanite supporting sheet, and

Fig. 5 is a perspective view of a modified form of the capacitor.

The capacitor is assembled in the following manner: Tapped brass inserts 10 are set up in a suitable jig, not shown, a suitable distance apart, usually about 1¼ inches on centers, and connecting clamps are secured thereto. The inserts or terminals 10 are tapped for any suitable thread at 12 and are also provided with annular grooves 11, whose function will be described more in detail hereinafter.

The connecting clamps, or connectors, designated generally by the numeral 13, are provided with shelf portions 14, of any suitable width, which may be varied as desired. Clips 15 are struck up from the shelf portion of the connector, and a connector lug 17 is formed by bending the metal intermediate the upright clips 15 downwardly as shown at 16 and then straightening the portion 17 out parallel with member 14. The connector lug is provided with a cut out portion 17ᵃ for a purpose now to be described.

The connectors 13 are secured to their respective terminals by fitting members 17 into the grooves 11, the cut out portions 17ᵃ ensuring a snug fit between the parts. The projecting lugs of members 17 are then crowded or spun inwardly toward each other to insure a perfect mechanical fit and electrical contact between the two members. While these parts are preferably mechanically joined, for simplicity in manufacture, it is readily apparent that they may be soldered, brazed or welded together.

A sheet of micanite 18 of suitable thickness to enable it to serve as a base and support for the stack 19 of foils and dielectrics is conformed as shown in Fig. 4 to the desired shape. The sheet may be made of any other suitable insulating material having the requisite mechanical and dielectric strength, such as fiber board or the like. As shown in Fig. 4, the supporting insulating plate is provided with arcuate cut-out portons 18ª, adapted to conform to the peripheral structure of terminals 10. It will be understood that the terminals may be of any desired configuration, and the cut-out portions 18ª of the supporting plate 18 will be correspondingly varied.

Adjacent the cut-out portions of plate 18, and symmetrically positioned with respect thereto, are provided slots 18ᵇ adapted to register with the upright clips 15 which are inserted therein to a point where the shelf portion 14 of the connectors abuts against the supporting plate and provides a substantial bearing surface or platform centrally of the supporting plate for a purpose which will be described hereinafter.

With the construction just described there results a combination support for a stack of alternate foils and dielectrics, such as mica sheets, which is adapted to serve as a forming jig or frame, as well as subserve the function of an improved clamping means for the condenser stack, which function will be discussed in detail later.

As above intimated, the connectors and supporting insulating plate when associated in cooperative relationship as described, are adapted to serve as a forming jig. The jig being in position, the condenser stack is built up of suitably prepared mica dielectrics and armatures or foils. The dielectrics are so shaped as to conform substantially to the area defined by the upright clips and are wholly situate within such area. The foils are alternated with the dielectrics, as is customary, the overlapping free ends of the foils forming foil bunches 19ª. When the stack has been built up to the desired capacity, the projecting upright clips, which hitherto have served as forming guides, are now bent over the assembled stack, while the latter is appropriately compressed, in such a manner as at 15ª to serve as a permanent clamping means for the assembly.

The foil bunches are held in good electrical connection with each other and with the connectors by the mechanical compression exerted by the bent over clip portions 15ª, thereby obviating the necessity of soldering the foils together and to the terminals. Due to the absence of soldering paste or other chemicals, there is no tendency for the foils to corrode, and the capacitor is thus rendered susceptible of long life without danger of internal corrosion of its parts. Where exceptionally low resistance is required, as in high frequency work, solder may be used, although, as above noted, its use is to be determined by the conditions of operation.

The compression afforded by the clip members serves to keep the foils and dielectrics in optimum cooperative relationship, which compression is absolutely essential for the preservation of the fixed capacity of the finished capacitor, as any disruption, or separation, of the foils and dielectrics deleteriously affects the capacity of the unit.

The unit above described can now be used as a capacitor, and due to its rugged construction, is enabled to withstand more than the ordinary amount of rough handling, as the stack members are positively held between the upright portions of the clips 15, and further held in positive locking engagement with the supporting plate by the bent over and downwardly pressed clip portions 15ª. The cooperative relationship existing between the supporting plate 18, the shelf portions of the connectors, the stack members and the clips is a highly efficient one, and one which is secured at a minimum of cost, both for labor and materials, and further is one which assures absolute uniformity of construction and capacity in the finished articles, which features are of no mean importance in an art where minute variations in structure may have disastrous results.

While the capacitor may be used in the form above described, it is preferred to provide it with an integral molded casing to preclude the entrance of moisture and dirt, and to act as a mechanical protection to the stack elements. In addition, such a casing is susceptible of being made up into an article having a pleasing, characteristic design, which serves at one and the same time to attract the purchasing public and identify the article so encased as the product of the maker.

The capacitors are molded, as above noted, with a molded casing, designated generally by the numeral 20, the material used being of any suitable composition, such as a potentially-reactive phenol-formaldehyde condensation product, which is adapted, under determined conditions of heat and pressure to be converted into a hard, infusible and insoluble resinoid body which of itself exerts a certain compressive action on the stack members, thereby serving to preserve the initial capacity at its optimum value.

The potentially reactive phenol condensation product is given solely by way of example, as it will readily be apparent that any suitable resin or resinoid body having the desired physical and chemical characteristics may be used without departing from the spirit and scope of the improvements comprising the present invention.

The molded capacitor is then ready for use in any suitable installation, and merely requires ordinary preliminary cleaning to remove excess material from the edges and around the terminals, together with a final check on the capacity.

If it is desired to stack or nest the capacitors to build up to a certain capacity which is a multiple of a unit capacity, the capacitors are connected together by any suitable means, well known to those skilled in the art. To conserve space, as is sometimes desired in various radio and electrical installations, the molded casing may be made perfectly flat, the terminals being flush with the top and bottom surfaces. Such a construction results in a distinct saving of encasing material, which saving is no inconsiderable item in the manufacturing cost, where the number of units made up runs into the hundreds of thousands over a given period of time. If desired, where a flattened construction is wanted, and costs are to be maintained as low as possible, the terminal members 10 may be solid rods which are not tapped until after the capacitor unit is completed and cleaned. This procedure obviates the difficulty of having the molding material enter the already tapped hole 12, with the necessity of cleaning it out or rejecting the whole unit where too much material is involved to warrant the cost of cleaning.

It is sometimes desired to incorporate a fixed capacity as an integral part of a radio or electrical apparatus. The capacitor 21 shown in Fig. 5, which comprehends the underlying principles of the present invention, is designed for such purposes, although it may be used as a demountable unit, if desired. In this construction the shelf portions of the connectors 13$^a$ have been increased in area so as to provide supporting members 14$^a$, each of which extends substantially under half of the stack area of the supporting plate but out of electrical contact with the other, thereby furnishing a metallic support for the plate and stack. The upright clips 15$^b$ are prolonged to furnish elongated bearing portions 15$^c$ which, when bent over the foils and stack, exert pressure over substantially the entire top of the stack, cooperating with the members 14$^a$ to provide uniform compression throughout the active area of the capacitor. The connectors serve directly as terminals, being connected to appropriate leads in any desired manner, no terminal posts being used. The supporting insulating plate 18$^c$ of micanite, or any other suitable material, is slotted at 18$^d$ for the purposes already described, and the arcuate cut-out portions of the member shown in Fig. 4 are dispensed with, thereby affording a substantial saving in manufacturing cost. In this instance, as in the one already described, the connectors and the supporting plate serve as a forming jig, and on compression of the upright clips further serve as integral parts of the stack compressing means.

It will now be seen that there has been provided an improved capacitor in which the clamping elements are associated with a supporting plate in such a manner as to form a forming jig for the building up of a stack of alternate foils and dielectrics to any desired capacity, after which the above named elements are compressed into further cooperative relationship to serve as permanent improved clamping means for the so formed stack, whereby the stack elements are permanently locked in their desired functioning association and the completed unit is adapted to withstand an unusual degree of rough handling.

It will also be appreciated that the improved capacitor of the present invention is peculiarly adapted, by reason of its novel construction, to be incorporated in, or provided with, a molded casing of any suitable configuration without depending upon the compressive force exerted by such casing.

While certain preferred embodiments of the invention have been shown, it is to be understood that these are given purely for purposes of illustration, for since the underlying principles may be incorporated in other specific structures, it is not intended to be limited to those shown, except as such limitations are clearly imposed by the appended claims.

I particularly point out and distinctly claim the part, improvement or combination which I claim as my invention or discovery, as follows:—

1. In a capacitor, in combination, a stack of alternate foils and dielectrics, an apertured supporting plate for the stack, connecting clip terminals for the poles of opposite polarity adapted to compress the stack members and the supporting plate in a positively locked cooperating relationship, said terminals comprising upright clip portions adapted to register with the apertures in said plate, and shelf portions integral with the clips and adapted to underlie and support the plate, the whole being adapted to be compressed into permanent locking engagement.

2. A forming jig for capacitors of the sheet stack type comprising alternate sheets of foils and dielectrics, said jig comprising an apertured supporting insulating plate, upright clips passing thru the apertures and defining stack edges, and shelf portions integral with the clips and adapted to underlie and support the plate.

3. A forming jig for capacitors of the sheet stack type comprising alternate sheets of foils and dielectrics, said jig being adapted to serve as a permanent clamping and compression means for the capacitor stack, and consisting of an apertured supporting insulating plate and connectors including clip portions passing thru the apertures in the plate, and shelf portions integral with the clip portions and adapted to underlie the supporting plate in supporting relation.

4. A capacitor comprising a compacted compiled condenser element having a definite electrical capacity including means comprising at least one plate of stiff insulating material having apertures therethru and two metallic clamps on opposite sides of the element, said clamps having ears intermediate their ends for entering said apertures to hold the clamps and plate in mechanical interlocking engagement and effect electrical contact of the clamps with the conducting elements of the condenser, said clamps passing thru the apertures in the element and adapted to be pressed over onto the stack with a pressure sufficient to make the electrical contact and to retain the capacity of the capacitor.

5. A condenser comprising alternate layers of mica and metal foil extending beyond the mica on two sides, clamping members in electrical engagement with the metal foil embracing the layers of mica and foil and means for preventing both said clamping members from being moved in any direction, comprising a plate of stiff insulating material having recesses spaced a substantial distance from two opposite edges and away from the other two edges and at least one ear on each of said clamping members intermediate its ends, said ear or ears being adapted to pass thru said recesses substantially as described.

6. A capacitor comprising a stack of dielectric and metallic sheets, arranged in groups having projecting ends of opposite polarity at least one apertured bearing member of stiff insulating material underlying the bottom of the stack, terminal clamping members of relatively stiff metallic material extending thru the apertures and around the opposite ends or sides of the stack and of substantially the same width as the stack and engaging said group ends and securing means arranged to cooperate between the bearing member and the terminal clamping members so as to secure pressure on the group ends and bearing member for substantially their full length.

7. A molded capacitor comprising a stack of dielectrics and metallic sheets, an apertured bearing plate for the stack; clamping means for the stack comprising terminal members provided with upstanding lugs adapted to pass thru the apertures and be forced into clamping engagement with the foil ends and the top of the stack, said terminal members also being provided with shelf portions adapted to underlie the bearing plate and coact with the bent over lugs, and being further provided with outstanding connector lugs engaging terminal posts, the whole being encased in a molded casing as and for the purposes described.

8. The improvement in the method of making capacitors, comprising forming an apertured supporting plate, inserting clamping members thru the apertures whereby to form a jig, building a stack of alternate foils and dielectrics in the so-formed jig, and compressing the clamping members over and on the stack members, substantially as and for the purposes described.

9. The improvement in the method of making capacitors, comprising forming an apertured supporting plate, inserting clamping members thru the apertures to provide a forming jig, building a stack of alternate foils and dielectrics in the so formed jig, compressing the clamping members over and on the stack members to secure the requisite capacity, and encasing the resulting capacitor in a suitable insulating covering.

In testimony whereof I hereunto affix my signature.

WILLIAM M. BAILEY.